(No Model.)
D. T. ELLIS.
VALVE MECHANISM.
No. 298,738. Patented May 20, 1884.
Fig. 1.
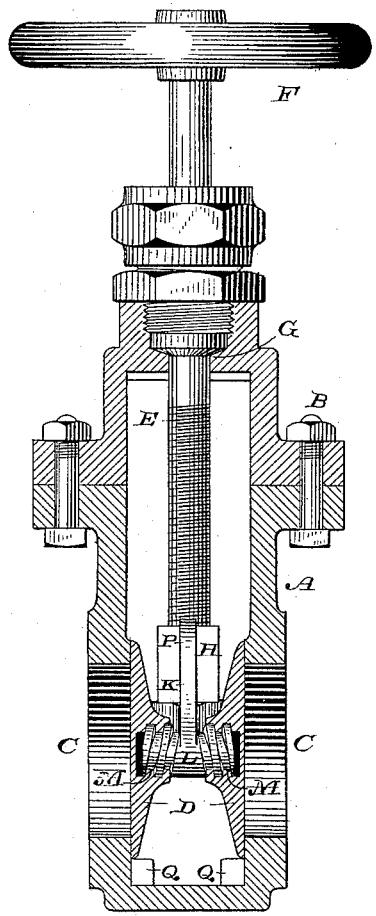
Fig. 2.
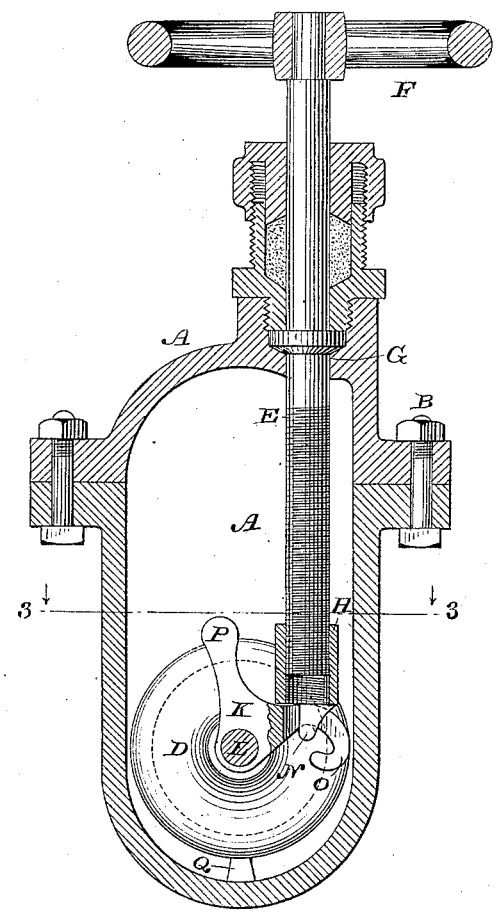
Fig. 3.
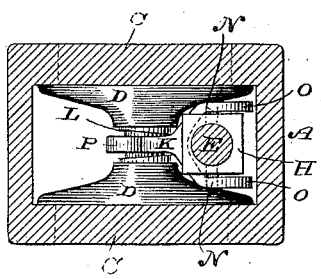
Fig. 4.
WITNESSES
Wm A. Skinkle
Al. C. Newman
INVENTOR
David T. Ellis,
By his Attorneys
Baldwin, Hopkins, & Peyton.

United States Patent Office.

DAVID T. ELLIS, OF BRIDGEPORT, CONNECTICUT, ASSIGNOR OF ONE-HALF TO THE BELKNOP MANUFACTURING COMPANY, OF SAME PLACE.

VALVE MECHANISM.

SPECIFICATION forming part of Letters Patent No. 298,738, dated May 20, 1884.

Application filed January 31, 1884. (No model.)

*To all whom it may concern:*

Be it known that I, DAVID T. ELLIS, of Bridgeport, in the county of Fairfield and State of Connecticut, have invented certain new and useful Improvements in Valve Mechanism, of which the following is a specification, reference being had to the accompanying drawings, in which—

Figure 1 is a central vertical section of my improved valve. Fig. 2 is a similar section taken at right angles to the section shown in Fig. 1. Fig. 3 is a section on the line 3 3 of Fig. 2; and Fig. 4 is a plan view of a right and left screw and lever for operating it detached.

The object of my invention is to produce a safe and reliable as well as economical straight-way-valve—that is to say, a valve that will stop the flow of a liquid through it perfectly, and can be withdrawn from the path of the liquid through the ports entirely, so that the flow shall be as free and unobstructed as through an ordinary pipe.

In the accompanying drawings, A indicates the valve-shell, which, as shown, is made of two parts united together in the usual manner by bolts and nuts B.

C indicates the ports through this shell, D D the valves, and E a screw-rod provided with a hand-wheel, F, and properly packed in any usual manner, as illustrated in the upper parts of Figs. 1 and 2, so as to work water or gas tight.

G indicates a recess in the valve-shell above the ports, down through which the screw E extends into a sleeve-nut, H. This sleeve-nut H is connected in any suitable manner to a hook-lever, K, which is fixed to or forms an extension from a right and left threaded screw, L, which works in screw-bearings M within the valves D D.

The connection between the sleeve-nut and the hooked arm of the lever, as shown, is made as follows, but it may be made in any other convenient way:

N N are pins projecting out from opposite sides of the sleeve-nut, over which the bifurcated parts O O of the hook-lever straddle and hook.

P indicates an arm of the lever, which, by bearing against the inside of the shell, may operate as a stop to the turning of the lever and as a guide in lifting the valves. The organization is such, as will now be seen, that when the screw-rod E is turned in a direction to raise the sleeve-nut the first effect will be to turn the hook-lever, and with it the right and left screw, within the valves. This will relieve the pressure of the valves upon their seats, and at the same time bring the arm P over against the side of the valve. The continuation of the operation of the screw to operate the sleeve-nut will raise the valves up into the recess G in the upper part of the valve, so as to open the ports perfectly and free them from all obstruction. When it is desired to close the ports, the screw-rod is turned in the opposite direction, and when the valves have reached the limit of their downward movement they will be stopped, as indicated, by the stops Q Q. (Shown in Fig. 1.) As the sleeve-nut continues to descend the only effect it can now have is to turn the hook-lever into the position shown in Fig. 2, which, by operating upon the right and left screw, will cause the valves to be firmly seated water or gas tight. The friction of the valves thus compressed upon their seats will prevent them from turning when the hook-lever and right and left screw are turned to release the pressure of the valves.

What I claim as new is—

1. The combination, with the shell and its ports, of the screw-rod, the sleeve-nut, the hook-lever, the right and left screw, and the sliding valves, substantially as set forth.

2. The combination, in a valve mechanism, of sliding screw-threaded valves, and a right and left screw engaging therewith, with suitable means for operating the screw to loosen the valves and to slide them away from the ports, substantially as set forth.

In testimony whereof I have hereunto subscribed my name this 28th day of January, A. D. 1884.

DAVID T. ELLIS.

Witnesses:
A. H. WARNER,
JOHN W. BRADLEY.